United States Patent [19]
Doemes et al.

[11] Patent Number: 5,969,270
[45] Date of Patent: Oct. 19, 1999

[54] FORCE SENSOR

[75] Inventors: Guenter Doemes, Holzkirchen; Markus Gilch, Mauern; Thomas Brandmeier, Wenzebach, all of Germany

[73] Assignee: Siemens Aktiengesellschaft, Munich, Germany

[21] Appl. No.: 08/992,824

[22] Filed: Dec. 17, 1997

[30] Foreign Application Priority Data

Dec. 20, 1996 [DE] Germany ............................ 196 53 427

[51] Int. Cl.[6] ........................................... G01L 1/12
[52] U.S. Cl. ............................ 73/862.626; 73/780
[58] Field of Search ........................... 73/780, 862.337, 73/862.621, 867.626, 724

[56] References Cited

U.S. PATENT DOCUMENTS

| | | | |
|---|---|---|---|
| 4,089,036 | 5/1978 | Geronime | 73/862.626 |
| 4,320,667 | 3/1982 | Forrester et al. | 73/862.626 |
| 4,384,496 | 5/1983 | Gladwin | 73/862.626 |
| 4,386,533 | 6/1983 | Jackson et al. | 73/862.626 |
| 5,488,869 | 2/1996 | Renaud | 73/724 |

FOREIGN PATENT DOCUMENTS

| | | |
|---|---|---|
| 257 492 | 6/1988 | German Dem. Rep. . |
| OS 1 909 979 | 9/1969 | Germany . |
| 1 497 212 | 12/1980 | United Kingdom . |
| WO 92/15000 | 9/1992 | WIPO . |

*Primary Examiner*—Max Noori
*Attorney, Agent, or Firm*—Hill & Simpson

[57] ABSTRACT

A capacitive force sensor is introduced between an actuator and motor vehicle brake shoe and is composed of a closed, metallic hollow cylinder that accepts a plate capacitor. One or more end faces of the hollow cylinder act as force-absorbing membranes and transmit elastic deformations onto the plate capacitor, a measured signal being generated as a result. The force sensor can be utilized in a range of measurement of up to, for example, 2.5 tons, a temperature range from −40 through 350° C. and also exhibits extremely high measuring precision.

12 Claims, 2 Drawing Sheets

FORCE SENSOR

BACKGROUND OF THE INVENTION

1. Field of the Invention

The present invention is directed to a force sensor for making a direct force measurement in the force flux, i.e., in the force field produced by a force to be measured. A direct force measurement means that the directly charged with the force to be measured. Usually disposed to oppose or yield to the force to be measured, the force sensor thereby transmits the force to be measured and simultaneously measures it.

2. Description of the Art

The actuation of brakes, particulary in the motor vehicle field, currently ensues hydraulically. For various reasons, a switch to purely electrically actuated via an electric motor with gearing. This can occur, for example, on the basis of the motion of a spindle running in an electric motor.

A constant measurement of braking force is required for safety reasons as well as for controlling the braking procedure. This should ensue directly at the brake shoes insofar as possible. Considerable temperature differences, however, prevail in this region. The temperature range to be taken into consideration at a caliper extends from approximately −40° C. up to approximately 350° C. The range of force measurement extends up to a few tons. Additionally, of course, a high precision should be assured, for example a measuring reliability with less than 1% deviation. Additionally, there is a need to accommodate very rapid temperature changes which occur during normal operation of a motor vehicle brake. Enormous impact stresses perpendicular to the motor vehicle axle are also present. The force sensor thus should have a permanent load alternation endurance as well as an absolute insensitivity to moisture. Insensitivity to electromagnetic emission is likewise meaningful. Other complicating factors are that only a small space is available in the region of the motor vehicle brake, and the system costs should be optimally low.

Known force sensors are, for example, piezosensors or strain gauge time sensors. The latter represent an indirect measuring method, whereby the sensor does not lie in the force flux. Neither of these systems even approximately satisfies the aforementioned extreme demands. Other systems, for example, are capacitive pressure and silicon-based force sensors. These, however, do not satisfy the extreme operating conditions or the cost demands.

SUMMARY OF THE INVENTION

An object of the present invention is to provide a force sensor with an expanded range of measurement with respect to the force to be measured and the expected operating temperature which simultaneously achieves a high measuring precision.

The invention is based on the perception that a capacitive force sensor composed of a metallic hollow cylinder that is installed between the actuator or actuating drive and a mechanical brake element, for example, a brake shoe, in the force flux meets all of the aforementioned desired demands. At least one end face of this closed, hollow-cylindrical sensor is fashioned as a force-absorbing membrane. The employment of a capacitive sensor allows the generation of measured signals on the basis the variation of the plate spacing of a plate capacitor. Such a plate capacitor is integrated within the hollow-cylindrical sensor. The coupling between a force-absorbing membrane of the sensor housing or an end face of a sensor and the plate capacitor occurs such that distance changes between the electrodes of the plate capacitor occur uniformly over the entire area thereof, so that the electrodes, which are aligned parallel, are only displaced parallel relative to one another and do not vary in terms of their geometry.

DESCRIPTION OF THE PREFERRED EMBODIMENTS

Figure 3:
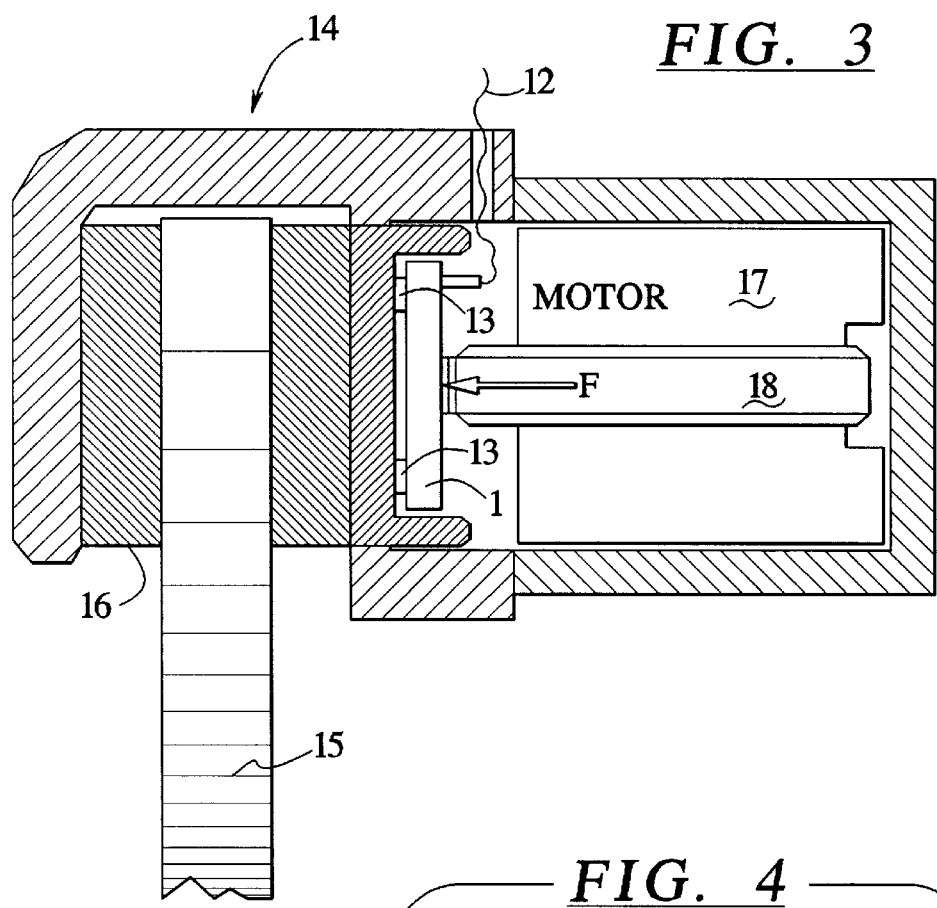
FIG. 3 shows a schematic sectional view of a motor vehicle braking system with an inventive force sensor integrated in the force flux.

In accordance with the invention a capacitive force sensor 1 is introduced between an actuating drive (actuator) and caliper 14 (FIG. 3). This sensor 1, which is preferably flat and composed of a closed, metallic hollow cylinder, must be able to withstand the most unfavorable operating conditions. First, the cylinder walls contribute to the mechanical stability. One or both end faces serve as a force-absorbing membrane 31 and/or 32, so that an elastic deformation of one or both end faces is transmitted onto the plate capacitor situated within the sensor 1, whereby a measured signal that is dependent on force or deformation is generated.

Figure 1:
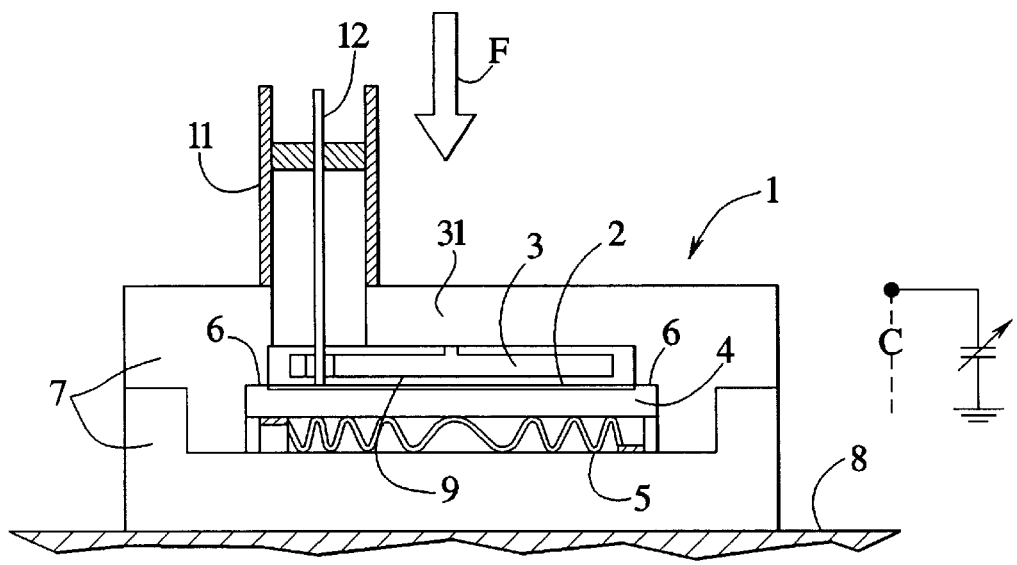
FIG. 1 shows a sectional view of a first embodiment of a force sensor according to the invention, having an end face fashioned as a force-absorbing membrane.

The plate capacitor disposed in the interior of the force sensor 1 has a metal disk 3 (second electrode) and an insulator disk 4, partially metallized at one side, the metallization representing the first electrode 2. The first electrode 2 and the second electrode 3 have an electrode spacing 9 therebetween of approximately 100 $\mu$m. As can be seen in FIG. 1, the force-absorbing membrane 31 is connected—approximately in its midpoint—to the midpoint of the metal disk 3 (second electrode). The first electrode 2 lying opposite the metal disk 3 is pressed such against a seat 6 fashioned in the interior of the sensor 1 so that the metal disk 3 and the insulator disk 4 with the metallization (first electrode) reside parallel opposite one another. Given deformation of the force-absorbing membrane 31, this design enables a uniform variation of the electrode spacing 9 over the entire area of the plate capacitor. This precludes the electrode spacing 9 from changing more in the middle of the plate capacitor than at the edge thereof given deformation of the force-absorbing membrane 31 due to a force, for example a braking force F, acting centrally thereon. A high measuring precision with good reproducibility of the measured signals is achieved as a result. It is also important that this design precludes the braking force F from being distributed surface-wide on the sensor 1, since a deformation at an end face would otherwise not ensue.

FIG. 1 shows that the housing of the sensor 1 is composed of two elements 7 for mounting, so that the closed hollow cylinder can be assembled after the installation of the interior component s. A signal line is conducted via a terminal 11 to the exterior of the housing formed by the elements 7. The interior of the sensor 1 must be hermetically sealed for protection against contamination. The embodiment shown in FIG. 1 presumes that the housing or the metal disk 3 is/are electrically applied to ground (as indicated by the circuit excerpt shown in FIG. 1), so that an electrical signal can be picked up. The insulator disk 4 is preferably composed of silica glass, so that high temperature resistance given low thermally caused expansions is achieved. By means of the spring 5, which is an annular, no-sag spring substantially co-extensive with the insulator disk 4, the insulator disk 4 is pressed against the detent or detents 6 with little lateral latitude (play) relative to the sensor housing. The position of the insulator disk 4, whose metallized side represents the first electrode 2, is thus defined as a constant reference. It should be noted that the insulator disk 4 lies directly against the detents 6 and that no metallization is present in these regions, so that no electrical contact is present between the housing and metallization. Thus, no thermal-mechanical stresses arising, for example, due to welded or soldered connections can influence the reference position of this insulator disk 4. This is true given vibrations as well as given high temperatures. For example, vibrations due to perpendicularly impact stresses at motor vehicle wheels do not act perpendicular to the electrode surfaces of the plate capacitor in braking systems of a standard type.

The rugged plate capacitor, whose electrode spacing basing 9 is reduced, for example, by half given initiation of the braking force F at a membrane, functions given high temperature fluctuations. This system is likewise realized in the embodiment of FIG. 2, wherein the sensor 1 has two force-absorbing (deformable) membranes 31 and 32. The two membranes 31 and 32 are centrally mechanically connected to one another via a membrane connection 10. The insulator disk 4, likewise a silica disk, again represents the first electrode 2 on the basis of a metallization applied to one side thereof. As described in connection with FIG. 1, this first electrode 2 is positioned, spring-supported with a spring 5, at detents 6 in a reference position and has minimum play laterally at the outside edges relative to the housing of the sensor 1. Due to correspondingly placed spacer elements 13, an elastic deformation of the membrane 32 is enabled since this is not supported surface-wide. The metal disk 3 representing the second electrode is directly connected to the membrane connection 10 in this case, so that this second electrode—just as in FIG. 1—moves uniformly toward the first electrode 2 with the deformation of the membranes 31 or 32 given initiation of a force. A uniform reduction of the electrode spacing 9 over the entire capacitor surface is thus also achieved with embodiment of FIG. 2.

Figure 2:
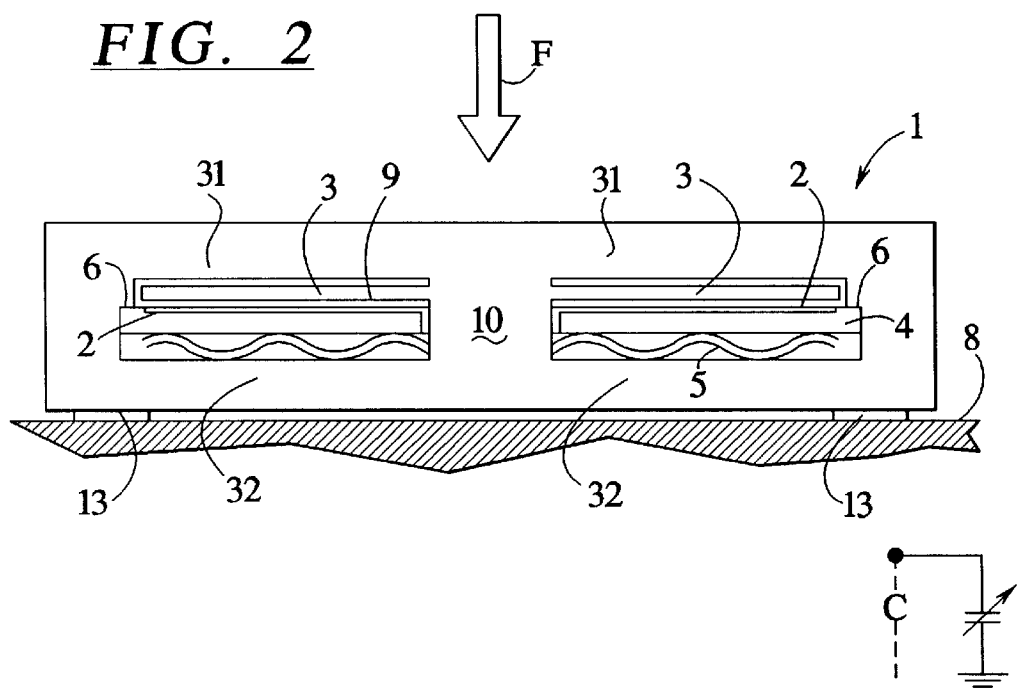
FIG. 2 shows a sectional view of a second embodiment of a force sensor according to the invention, having two force-absorbing membranes mechanically connected to one another.

The illustration of an electrical lead has been omitted in FIG. 2. In both embodiments, (FIG. 1 as well as FIG. 2), the forwarding (transmission) of signals should occur to measurement electronics that is positioned in regions having significantly lower temperature stress. The connection is expediently realized by a high-temperature-resistant coaxial cable with low capacitance per unit length. For example, the sensor 1 can have a diameter of 4 cm and a height of approximately 12 mm. Given a braking force F of 2.5 tons, the measuring capacitance changes, for example, from 50 of to 100 of. When the metal disk 3 is appropriately insulated at the membrane midpoint, or at its attachment to the membrane connection, then a mass-free measuring capacitor can be realized. Otherwise, however, a signal line 12 is also installed in FIG. 2 and the external housing of the sensor 1 is to be applied to ground.

All of the features illustrated in FIGS. 1 and 2 result in a force sensor 1 that is fashioned mechanically stable, has deformable force-absorbing membranes 31 and/or 32, via which—in conjunction with a plate capacitor—the force picked up or forwarded by the sensor 1 can be measured. This occurs on the basis of the design of the interiorly disposed plate capacitor with high precision (less than 1% deviation). The demands with respect to a large range of measurement for the force to be measured, or for the range of operating temperature, are met. Additionally, the sensor 1 exhibits stability to mechanical oscillations that, for example, occur during operation of a motor vehicle braking system. The sensor responds within 100 ms.

FIG. 3 shows a sensor 1 in combination with a motor vehicle braking system. A caliper 16 with brake linings is thereby positioned in a usual way relative to a rotating brake disk 15. In order to be able to correspondingly press the brake linings 16 against the brake disk 15, a force must be exerted on the encompassing caliper 14. In this case, this occurs via an electric motor 17 that moves a spindle 18. Electrical leads for the motor 17 are not shown. The braking force F thus generated is combined, of course, with a supporting force with which the motor is supported toward the rear of or in the opposing direction against, for example, a housing that surrounds the motor. Due to actuation of the motor 17, the spindle 18 is extended in the direction onto the sensor 1 and generates the braking force F. The functioning of the force sensor 1 is according to the descriptions of FIGS. 1 and 2. The signal line 12 conducts signals from this zone under high-temperature stress reliably toward the exterior of the sensor 1 so that the force sensor 1 can be completely closed in order to avoid the penetration of contamination.

Figure 4:
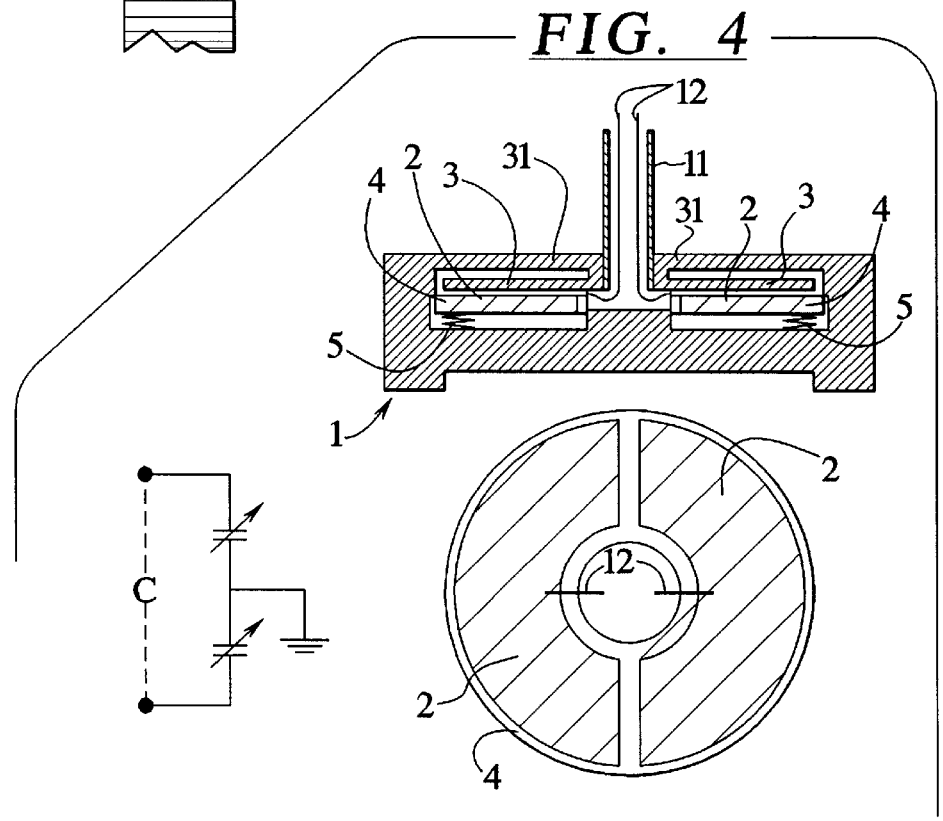
FIG. 4 shows a sectional view of a third embodiment of a force sensor according to the invention, wherein one of the electrodes is divided into a number of sub-electrodes with each sub-electrode being separately contacted.

FIG. 4 shows an embodiment of the invention, wherein the capacitance of the plate capacitor is not measured to ground for reasons of measuring dependability. To that end, the plate capacitor is structurally designed such that the second electrode connected to ground, which is illustrated by a metal disk 3, is implemented according to FIG. 1 and 2. According to FIG. 4, however, the first electrode 2 is divided into two parts so that variable capacitors are formed. Each electrode part is connected to its own signal line 12, so that the respective capacitances of the two variable capacitors are measured in a symmetrical measurement according to the equivalent circuit diagram shown in FIG. 4. A single electrode is physically present that, however, is divided. This results in the first electrode 2 and the second electrode, formed by the metal disk 3, moving toward or away from one another over the entire surface as a result of the described structure, given mutual spacing changes between the electrodes. Thus, a variation of the geometry of the planarly implemented electrodes is also avoided in this embodiment. Moreover, in the embodiment of FIG. 4, an adequately large capacitor surface can thus be achieved, so that membranes which are variable in terms of their geometry need not be used as parts of the plate capacitor. These advantages can be realized with a very small structural volume of the force sensor and can also be exploited within a broad range of operating temperatures.

Although modifications and changes may be suggested by those skilled in the art, it is the intention of the inventor to embody within the patent warranted hereon all changes and modifications as reasonably and properly come within the scope of his contribution to the art.

We claim as our invention:

1. A force sensor for direct measurement of a force, comprising:

a closed hollow housing having an end face comprising an elastically deformable membrane onto which a force to be measured is incident;

a plate capacitor having first and second plates, separated by a plate spacing, disposed inside said hollow housing;

said first plate comprising an insulator disk unattached to said housing having a surface partially covered by a metallization, said metallization on said surface of said insulator disk comprising a first electrode of said plate capacitor;

a support edge in said housing against which said insulator disk is supported;

a spring in said housing urging said insulator disk against said support and toward said membrane, said support maintaining said insulator disk parallel to said second plate; and a metal disk comprising said second plate of said plate capacitor and comprising a second electrode of said plate capacitor, said metal disk being disposed opposite said metallization on said insulator disk, and connector means for connecting said metal disk at a center of said metal disk to said membrane for causing said metal disk to move uniformly parallel to said insulator disk upon a force being incident on said membrane to uniformly decrease said electrode spacing between said first and second electrodes given movement of said membrane to produce a change in said capacitance of said plate capacitor dependent on the uniform decrease of said electrode spacing as a measure of a magnitude of said force.

2. A force sensor as claimed in claim 1 wherein said insulator disk is comprised of silica.

3. A force sensor as claimed in claim 1 wherein said plate capacitor has an electrode spacing of approximately 100 micrometers.

4. A force sensor as claimed in claim 1 further comprising a coaxial cable, having a low capacitance per unit of length, connected to said metallization and proceeding through said housing to an exterior of said housing.

5. A force sensor as claimed in claim 1 wherein said metal disk is electrically insulated from said membrane and has a separate coaxial terminal, so that said plate capacitor comprises a mass-free capacitor.

6. A force sensor as claimed in claim 1 wherein said metallization is divided so that said first electrode comprises a first sub-electrode and a second sub-electrode, and said force sensor further comprising first and second separate signal lines respectively connected to said first and second sub-electrodes.

7. A force sensor for direct measurement of a force, comprising:

a closed housing having two opposed exterior faces respectively comprising elastically deformable membranes, said housing having a centrally disposed connection element mechanically connecting said opposed faces to each other in an interior of said housing and said housing containing first and second hollow chambers therein respectively disposed on opposite sides of said connection;

a first plate capacitor disposed in said first hollow chamber and a second plate capacitor disposed in said second hollow chamber, each of said plate capacitors having a plate spacing which varies given an external force acting on at least one of said membranes;

each of said first and second plate capacitors comprising an insulator disk, partially metallized at one side and comprising a first electrode of the plate capacitor and a metal disk, unattached to said housing, comprising a second electrode of the plate capacitor disposed opposite a portion of the metallization on the insulator disk, and a mechanical connection between said metal disk and one of said membranes;

said housing comprising, in each hollow chamber, a support edge which supports the insulator disk parallel to the metal disk and a spring disposed for urging said insulator disk against said support edge, so that when a force is exerted on at least one of said membranes, said metal disk moves parallel to said insulator disk with the electrode spacing decreasing uniformly between said metallization and said metal disk so as to change a capacitance of each of said first and second capacitors dependent on the uniform decrease of said electrode spacing as a measure of a magnitude of said force; and spacer elements disposed at an exterior of said housing so that each of said membranes is freely movable when a force is exerted thereon.

8. A force sensor as claimed in claim 7 wherein said insulator disk is comprised of silica.

9. A force sensor as claimed in claim 7 wherein said plate capacitor has an electrode spacing of approximately 100 micrometers.

10. A force sensor as claimed in claim 7 further comprising a coaxial cable, having a low capacitance per unit of length, connected to said metallization and proceeding through said housing to an exterior of said housing.

11. A force sensor as claimed in claim 7 wherein said metal disk is electrically insulated from said membrane and has a separate coaxial terminal, so that said plate capacitor comprises a mass-free capacitor.

12. A force sensor as claimed in claim 7 wherein said metallization is divided so that said first electrode comprises a first sub-electrode and a second sub-electrode, and said force sensor further comprising first and second separate signal lines respectively connected to said first and second sub-electrodes.

* * * * *